United States Patent [19]
Brooks et al.

[11] Patent Number: 6,058,623
[45] Date of Patent: May 9, 2000

[54] APPARATUS AND PROCESS FOR REMOVING VOLATILE COMPONENTS FROM A COMPOSITION

[75] Inventors: Burton Brooks, Bellevue; Walter A. Jessup, Seattle; Brian W. MacArthur, Redmond, all of Wash.

[73] Assignee: The Chemithon Corporation, Seattle, Wash.

[21] Appl. No.: 09/032,303

[22] Filed: Feb. 27, 1998

Related U.S. Application Data

[63] Continuation-in-part of application No. 08/475,046, Jun. 7, 1995, Pat. No. 5,723,433, which is a continuation-in-part of application No. 08/126,490, Sep. 24, 1993, abandoned.

[51] Int. Cl.[7] .................................................. F26B 3/08
[52] U.S. Cl. ............................... 34/362; 34/493; 34/134; 34/136
[58] Field of Search ............................... 34/362, 380, 381, 34/402, 493, 73, 78, 130, 134, 136, 138, 142; 159/2.1, 16.3, 46, 47.1; 203/18, 88, 92, 95

[56] References Cited

U.S. PATENT DOCUMENTS

| | | | |
|---|---|---|---|
| 1,571,189 | 2/1926 | Dressler | 34/493 |
| 2,710,057 | 6/1955 | Bassett et al. | 159/47 |
| 3,703,772 | 11/1972 | McHugh et al. | 34/9 |
| 4,039,171 | 8/1977 | Shearer | 34/136 X |
| 4,285,881 | 8/1981 | Yang | 260/458 |
| 4,430,156 | 2/1984 | Casper et al. | 159/47.1 |
| 4,515,707 | 5/1985 | Brooks | 252/368 |
| 4,696,767 | 9/1987 | Novakovic et al. | 252/557 |
| 4,906,329 | 3/1990 | Tominari et al. | 159/47.1 |
| 4,963,226 | 10/1990 | Chamberlain | 159/48.1 |
| 5,052,122 | 10/1991 | Ishikawa et al. | 34/5 |
| 5,160,580 | 11/1992 | Sassi | 159/47.1 |
| 5,183,540 | 2/1993 | Rubin | 34/493 X |
| 5,378,434 | 1/1995 | Staffin et al. | 34/370 X |
| 5,548,907 | 8/1996 | Gourdine | 34/448 |
| 5,723,433 | 3/1998 | Duvall et al. | 510/457 |

FOREIGN PATENT DOCUMENTS

| | | |
|---|---|---|
| 0 045 912 | 2/1982 | European Pat. Off. . |
| 0 123 812 | 11/1984 | European Pat. Off. . |
| 0 349 200 | 1/1990 | European Pat. Off. . |
| 0 402 112 | 12/1990 | European Pat. Off. . |
| 0 508 543 A1 | 10/1992 | European Pat. Off. . |
| 0 645 445 A1 | 3/1995 | European Pat. Off. . |
| 48-103082 | 12/1973 | Japan . |
| 51-41675 | 4/1976 | Japan . |
| 63-315101 | 12/1988 | Japan . |
| 1-46161 | 10/1989 | Japan . |
| 2-222498 | 9/1990 | Japan . |
| 276 903 | 7/1970 | U.S.S.R. . |
| 945 316 | 12/1963 | United Kingdom . |
| WO 92/18603 | 10/1992 | WIPO . |

OTHER PUBLICATIONS

Search Report dated Jun. 6, 1999, in counterpart European Application No. 99 103 664.1.

European Search Report, Issued on Nov. 30, 1994 in Application No. 94114240.8.

Maekawa et al., "Flash Vacuum Drying System 'Crux System'—Application in the Preparation of Superfine Micropowder and the Surface Treatment of Microparticles," *Funsai (Grinding)*, No. 35, pp. 32–38 (1991); and English translation thereof.

*Primary Examiner*—Henry Bennett
*Assistant Examiner*—Steve Gravini
*Attorney, Agent, or Firm*—Marshall, O'Toole, Gerstein, Murray & Borun

[57] ABSTRACT

Apparatus and processes for removing volatile components from a composition utilize a dryer having an inlet chamber and a plurality of channels. A flow restriction is disposed immediately upstream of the inlet of each channel with respect to a direction of flow of the composition through the dryer. The process includes the step of heating the composition at a location upstream of the flow restriction to a temperature above the flashing temperature of at least one of the components at a pressure of the channel inlet and applying a pressure to the heated composition to avoid such flashing. The process further includes the step of passing the pressurized, heated composition through the dryer inlet chamber, the flow restriction, and through the channels.

30 Claims, 5 Drawing Sheets

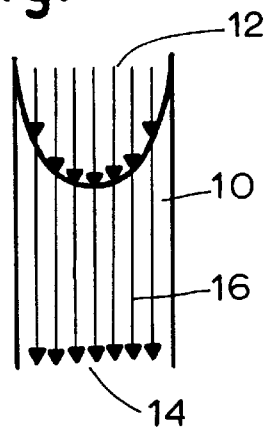
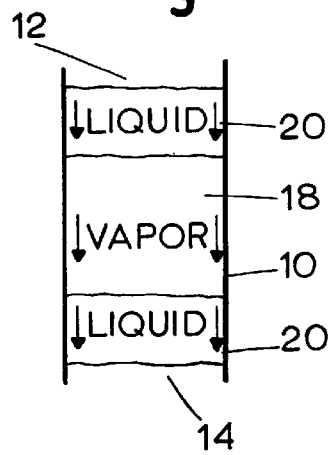
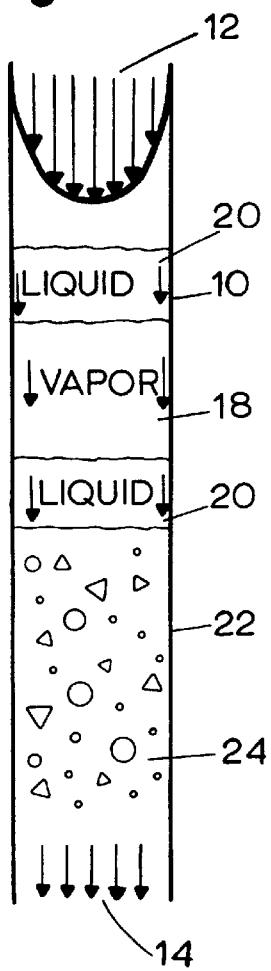
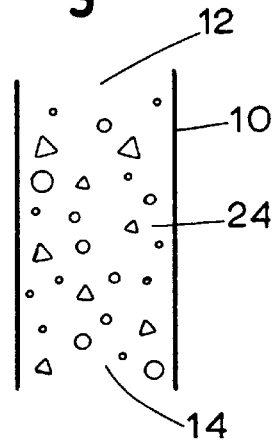
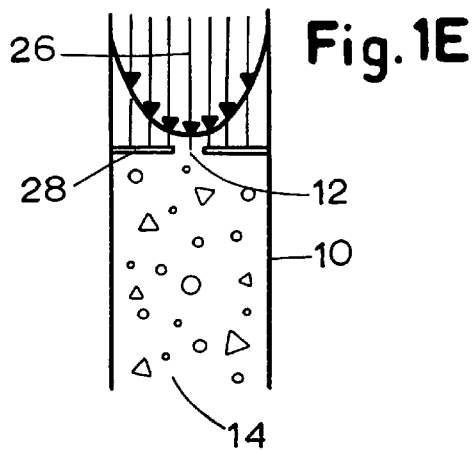

APPARATUS AND PROCESS FOR REMOVING VOLATILE COMPONENTS FROM A COMPOSITION

CROSS REFERENCE TO RELATED APPLICATIONS

This is a continuation-in-part of pending, commonly assigned application Ser. No. 08/475,046, filed Jun. 7, 1995, now U.S. Pat. No. 5,723,433 issued Mar. 3, 1998, which is a continuation-in-part of now-abandoned, commonly assigned application Ser. No. 08/126,490, filed Sep. 24, 1993.

BACKGROUND OF THE INVENTION

1. Field of the Invention

The invention relates generally to processes and apparatus for removing volatile components from materials such as solutions, dispersions, slurries, emulsions, and pastes. More particularly, the invention relates to processes for removing volatile components from materials with an apparatus having a plurality of channels.

2. Description of Related Technology

Detergent products contain surface active ingredients (sometimes referred to as "detergent active ingredients" or "detergent actives"), which may be neutralized salts of acids produced, for example, by sulfating or sulfonating $C_8$–$C_{20}$ organic materials and, preferably, $C_{11}$–$C_{18}$ organic materials, such as, for example, fatty alcohols, ethoxylated fatty alcohols, alkyl benzenes, alpha olefins, methyl esters, and alkyl phenol ethoxylates. The process of making detergent actives from the acid form is typically performed in a solvent, such as water and/or alcohol. The resulting detergent material may be a paste, a solution, or a slurry of various components. (The term detergent "paste" as used hereinafter is meant to include detergent solutions, slurries and pastes). Final detergent products are made from such detergent pastes.

One of the most common detergent products, a laundry powder, is conventionally prepared by mixing a paste containing the desirable detergent actives, and other by-products, various salts, detergent builders and water to form a slurry with about 25 weight percent (wt. %) to about 60 wt. % water, more preferably, from about 30 wt. % to about 45 wt. % water. Preferably, the paste ingredients are compatible with each other and are insensitive to the drying process.

A conventional method of producing a detergent powder by removing solvents from a detergent paste involves spraying the detergent paste counter-currently or co-currently with hot air in a spray-drying tower. This process most often yields a free-flowing, low density (approximately 0.3 specific gravity) granule having a moisture content of 2 wt. % to 12 wt. %. Since solvent removal in the spray-drying process requires heating and exhausting large amounts of air, the process tends to be energy intensive. Some conventional spray-drying processes also cause detergent actives and heat-sensitive builders to undergo physical and chemical degradation because of the severe drying conditions in certain regions of the spray-drying tower. Environmental concerns are yet another concern with such conventional processes. Exhaust gasses produced by drying a detergent paste in conventional spray drying processes may contain volatile organic materials and particulates requiring downstream pollution control measures. A better approach for making laundry detergent powder formulated products is to dry only those components of the formulation that require water (or other solvents) to be added to them during the manufacturing process. This typically would include the detergent actives, but other ingredients, such as sodium silicate for example, may also be admixed in the form of an aqueous (or solvent) solution. The dry actives mixture resulting from such a process step can then be agglomerated with the other dry salts and builders present in the formulation, using small amounts of suitable liquid agglomerating agents. Such an agglomeration step is accomplished in various types of commercial equipment, including fluid beds and tumbling drums, some of which may be equipped with mechanical agitators. To assist in this process approach, it is desirable to produce the detergent actives in as concentrated a form as possible. Drying of detergent actives, alone or in combination with other liquid ingredients of a product formulation, is performed using conventional spray drying processes with the aforementioned disadvantages and problems. Other commercial techniques have been practiced, such as drying with "wiped film" evaporators or drying on a heated surface of rotating drums (drum drying). The equipment is expensive, limited in production capacity, and is maintenance intensive. Some of these processing techniques will not handle highly concentrated pastes, and consequentially will be less energy efficient.

While problems encountered when drying detergent pastes in traditional drying equipment have been discussed thus far, it is noted that similar problems are encountered when drying a variety of materials, for example, organic and inorganic pigments, inorganic salts, food-stuffs and pharmaceuticals, which may be in the form of a solution, slurry or paste and may be heat sensitive. Also traditional drying equipment may not be suitable in situations wherein only selected components or selected amounts of components are to be removed from a composition, resulting in, for example, a more concentrated solution, or a solution or paste from which a particular undesirable component has been removed.

Thus, it would be desirable to provide a method and apparatus capable of removing volatile components from a variety of compositions that avoids the problems encountered by the prior art. More specifically, it would be desirable to provide a method and apparatus for producing a pure, dry detergent from a concentrated detergent paste. Furthermore, it would be desirable to provide a simple method and apparatus capable of making dry detergents on a large volume basis, which reduces the environmental concerns and high energy costs discussed above and does not lead to detergent active degradation. Also desirable would be a method and apparatus for removing volatile components from a wide range of materials which become soft and flowable at elevated temperatures. Furthermore, it would be desirable to provide a method and apparatus for drying a large number of organic and inorganic compounds that have no tendency to cake during the drying step, and that form discrete solid particles when dried. Still further, it would be desirable to provide a method and apparatus for drying highly concentrated viscous pastes, which are not possible to handle in some of the prior art processes.

SUMMARY OF THE INVENTION

It is an object of the invention to overcome one or more of the problems described above.

According to a process of the invention, volatile components are removed from a composition in a dryer having an inlet chamber, a plurality of drying channels, and a plurality of flow restrictions, wherein each channel includes an inlet operating at a pressure and wherein each flow restriction is disposed between the inlet chamber and one cooperating channel, the flow restriction being immediately upstream of the cooperating channel inlet with respect to a direction of flow of the composition through the dryer. The process includes the step of heating the composition at a location upstream of the flow restrictions to a temperature above a flashing temperature of a volatile component of the composition at the pressure of each channel inlet. The process further includes the step of passing the pressurized, heated composition through the flow restrictions and flashing a portion of the volatile ingredients within the flow restrictions as the composition experiences reduced pressures prior to entering the inlet of each drying channel. Heat may be supplied to the composition in each channel resulting in the further flashing, wherein vapor liberated during the flashing acts as an additional motive force to move the remainder of the composition through each channel.

Another aspect of the invention is an apparatus for removing volatile components from a composition, the apparatus including a dryer comprising an inlet chamber, a plurality of flow restrictions to a plurality of drying channels. Each channel has an inlet and an outlet, wherein the inlet is disposed immediately downstream of the flow restrictions with respect to the direction of flow of the composition through the dryer.

Other objects and advantages of the invention will be apparent to those skilled in the art from a review of the following detailed description, taken in conjunction with the drawings, the examples, and the appended claims.

BRIEF DESCRIPTION OF THE DRAWINGS

FIG. 1A is a diagram of a single-phase flow regime.

FIG. 1B is a diagram of a slug flow regime.

FIG. 1C is diagram of a transition flow regime.

FIG. 1D is a diagram of a two-phase flow regime.

FIG. 1E is a diagram of a two-phase flow regime according to the invention.

DETAILED DESCRIPTION OF THE INVENTION

Figure 2:
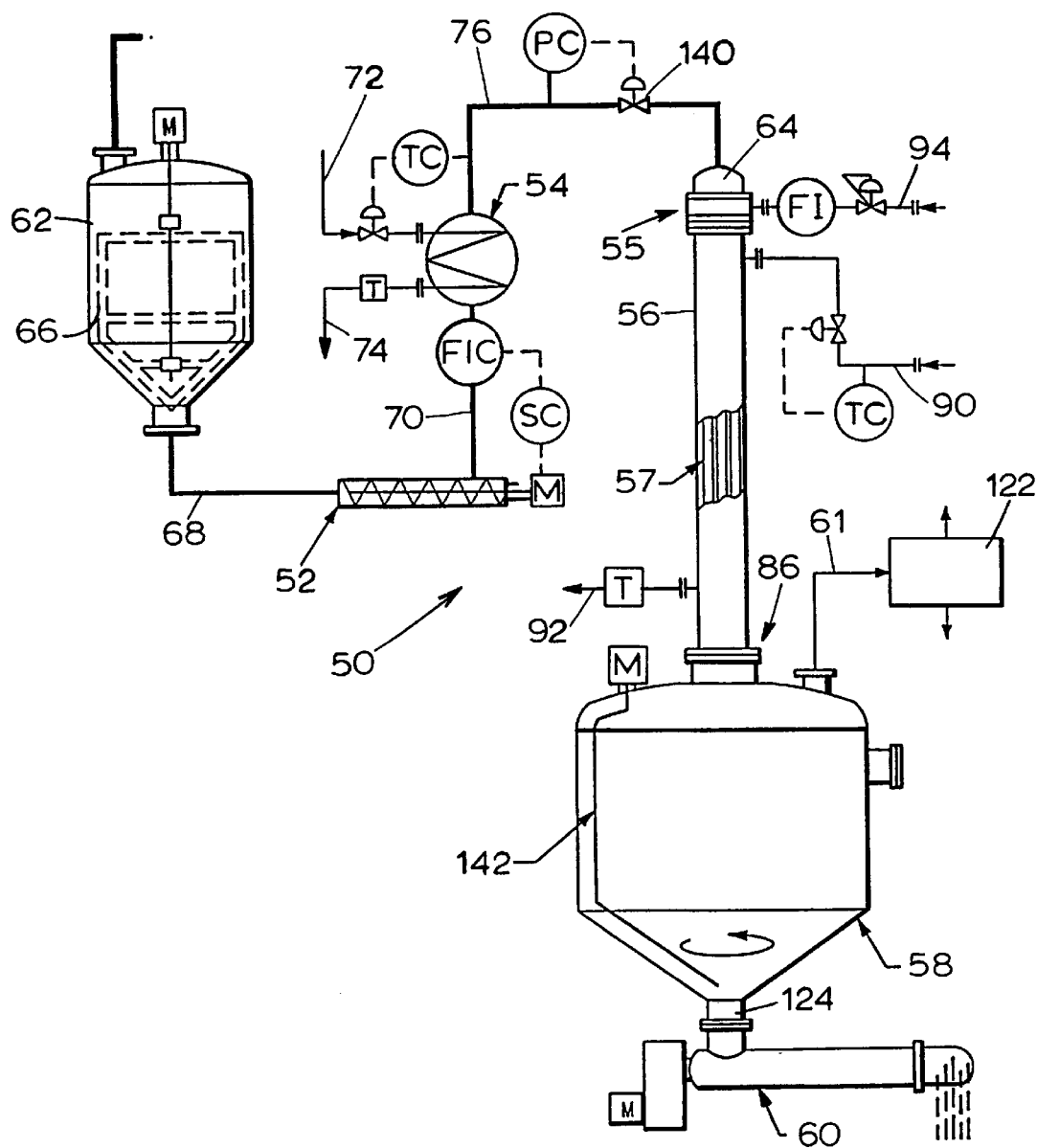
FIG. 2 is a process flow diagram illustrating an embodiment of an apparatus according to the invention.

A method of drying compositions disclosed in U.S. Pat. No. 5,723,433 teaches that a dryer having a single channel is suitable for removing solvents from a detergent paste composition at a selected production capacity limited by the channel size. However, when it becomes necessary to increase the production capacity, the inventors found that simply scaling the process to increase the dryer channel size was neither adequate nor practical. It was determined that scaling a single channel by maintaining a constant flow velocity would result in less heat transfer area unless the length of the dryer channel was proportionately increased. Scaling up by increasing the channel length would result in an unreasonably long dryer channel having a correspondingly high pressure drop, longer residence time, and an increased potential for fouling within the channel, thereby limiting heat transfer.

A more practical approach and an alternative to scaling by increasing channel size is to provide a dryer with a plurality of parallel, identical channels. Such an approach would preserve a geometry in which both the cross-sectional area, equivalent diameter, channel length, and loading remain constant throughout the dryer. Hence, it was believed that a dryer comprising multiple identical channels arranged in parallel would eliminate some of the aforementioned problems associated with an unreasonably long, single-channel dryer. Two problems encountered by the multi-channel dryer approach, however, are the difficulty in distributing certain compositions equally to each of the multiple channels and the avoidance of channel plugging. During operation of the dryer, the product may tend to flow through those channels providing the least resistance to flow, while other channels will become clogged with the dried product. The inventive apparatus and processes, however, overcome the problems associated with scaling to multiple channels, avoid the problem of uneven distribution of material through the multiple channels of the dryer, and avoid the onset of channel plugging.

According to the inventive methods and apparatus, channel plugging may be avoided by pre-heating the composition to a temperature that results in the flashing of at least one of the volatile components at a reduced pressure as the composition enters the drying channels. Shown in FIGS. 1A through 1E are portions of a dryer channel 10 having an inlet 12 and an outlet 14. With reference to FIG. 1A, as a composition passes through a flow restriction (not shown) and enters the channel inlet 12 at a temperature below its boiling point, single-phase liquid flow will result at the inlet as shown by the arrows 16. If the composition enters the channel at a temperature at or slightly above the boiling point of a volatile component of the composition, a "slug" flow will result as illustrated in FIG. 1B, where slugs of vapor 18 push slugs of liquid 20 through the channel 10. Additional heating of product flowing in the channel through a wall 22 which defines the channel, results in additional flashing of volatile components of the composition, increasing the vapor velocity, and changing the slug flow to a two-phase flow 24 as shown in FIGS. 1C and 1D. In the two-phase flow 24, particles of the composition are dispersed in and conveyed by a continuous vapor phase. To accomplish the desired two-phase flow 24 shown in FIG. 1D, an apparatus according to the invention shown in FIG. 1E is utilized. By heating a composition 26 located upstream of a flow restriction 28 to a temperature well above the equilibrium boiling point of the composition, and passing the composition 26 through the flow restriction 28 shown in FIG. 1E, a portion of the volatile ingredients will flash due to the pressure drop in the flow restriction 28. This release of vapor results in two-phase flow at the entrance 12 of the channel 10 and throughout the entire length of the channel 10 as shown in FIG. 1E.

It has been observed in an apparatus consisting of multiple drying channels, that if the composition enters the drying channels in one-phase flow, the flow will not remain uniform or constant in all channels, but will exhibit high flow rates in some channels where primarily two-phase flow is established, and low flow rates in some channels where primarily one-phase flow is established. The flow resistance across any drying channel depends on the nature of the flow and the flow rate. Further it has been observed that such channels with one-phase flow and low flow rates may eventually plug off due to the increasing concentration of solids. The result is that only the unplugged drying channels remain in active flow, but at increased loading, thereby decreasing the surface area for drying in the drying channels, and failing to achieve the desired product moisture level. The above result is observed even though flow restrictive devices are placed upstream of the entrances to the multiple drying channels.

It has also been observed that if the composition enters the inlet to the drying channels in two-phase flow, FIG. 1D, and there is sufficient vapor velocity throughout the drying channel 10, the flow rate and pressure drop in each of the identical multiple drying channels will remain substantially uniform and constant. The conclusion is that two phase flow throughout the length of the drying channel is more stable with respect to distribution and drying efficiency, than if the flow regime is changing from single-phase to slug flow and then to two phase flow within the drying channel.

A possible explanation of this is that the frictional resistance to flow is much greater in single-phase (liquid) flow than with two-phase (gas-liquid) flow at the same mass flow rate in a given channel. Also, higher flow rates will result in increased vapor velocity, promoting two-phase flow. In the first observation, due to the inlet conditions, the combination of these effects result in non-uniform distribution, some channels having primarily two-phase flow at high flow rates (low pressure drop per unit mass loading), and some channels operating at much lower flow rates in one-phase flow (higher pressure drop per unit mass loading). In the second observation, uniform and stable distribution is established because two-phase flow is established in all drying channels and any perturbation of flow between channels is resisted by the consequential imbalance in the vapor production through the inlet flow restriction. Thus all channels receive a uniform and constant loading, and drying efficiency is maximized.

The inventive apparatus and processes are illustrated in the drawing FIGS. 2–5. With reference to FIG. 2, an apparatus according to the invention generally designated 50 includes an inlet pump 52, a pre-heater 54, a restrictive device generally 55, a dryer 56 having dryer channels defined by tubes 57, a collection vessel 58, an outlet mechanism for the dried or concentrated product, such as a plodder, extruder or pump 60, and a vapor outlet, such as a vent 61. Also shown in FIG. 2 is a feed tank 62 for the supply of a composition into the inlet pump 52.

Figure 3:
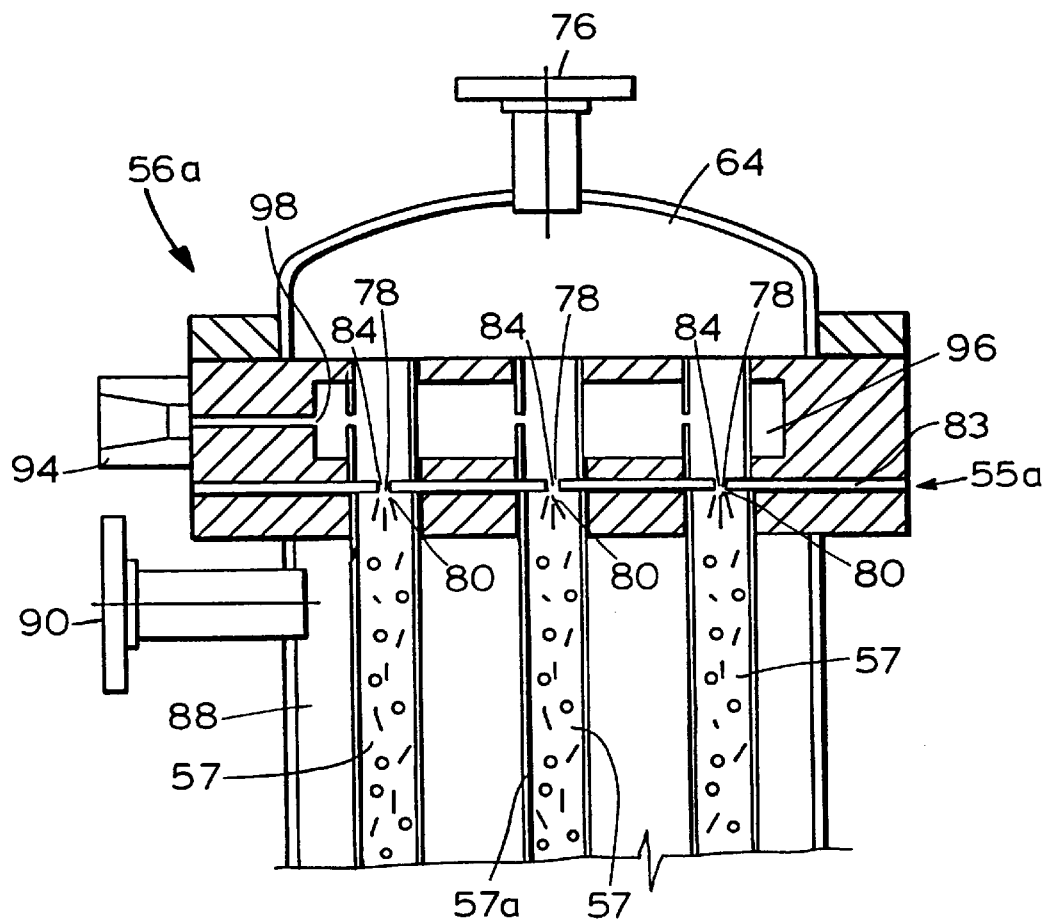
FIG. 3 is a partial, sectional view of a portion of the apparatus shown in FIG. 2.
Figure 4:
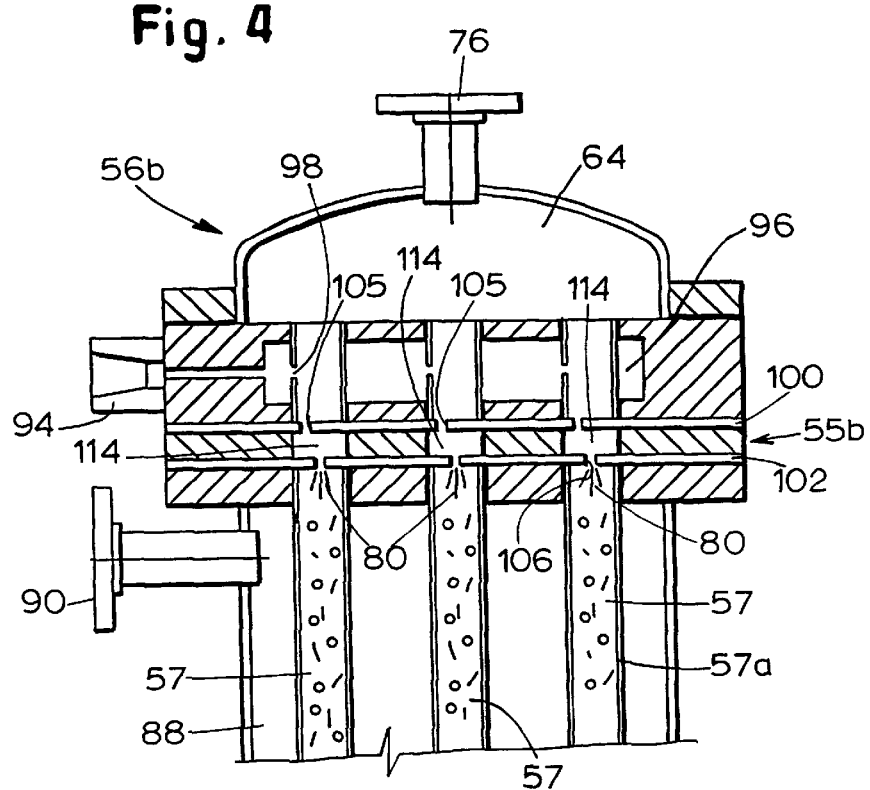
FIG. 4 is a partial, sectional view of a second embodiment of an apparatus according to the invention.

FIGS. 3 and 4 depict different embodiments of the dryer 56 shown in FIG. 2 and thus identify the dryer by the reference numerals 56a and 56b, respectively. However, elements of the dryer embodiments which are identical will be identified using the same reference numbers. Thus, each of the dryers 56a and 56b include dryer tubes 57 disposed downstream of a dryer inlet or distribution chamber 64. The dryers 56a and 56b differ with respect to their restrictive devices 55a and 55b, respectively.

A solvent-containing composition such as, for example, a detergent paste solution (also referred to as a feedstock material) to be dried or concentrated is fed from the feed tank 62, equipped with a wall-wiping agitator 66, by means of the pump 52, through a conduit 68 disposed between the feed tank 62 and the pump 52, and to the pre-heater 54. The pump 52 meters the composition through a conduit 70 and the pre-heater 54. The feedstock material may be, for example, a detergent paste solution containing less than about one weight percent (wt. %) to about 80 wt. % water. It may also contain other solvents, such as alcohol in an amount of up to about 40 wt. % or more, and/or volatile contaminates. In the pre-heater 54, the detergent paste solution is typically heated to a temperature above the vapor/liquid equilibrium temperature of the composition at the operating pressure of the downstream drying channels 57 (i.e., a temperature sufficient to vaporize a portion of one or more components at a reduced pressure, such as the operating pressure of a channel inlet of the downstream dryer 56).

The vapor/liquid equilibrium behavior of the composition may be determined in advance by laboratory measurements. From the measurements, it is possible to pre-determine the boiling or flashing point of volatile components in the composition and thus determine target operating conditions. Preferably, a target temperature is determined which is significantly above a flashing temperature of the composition at the operating pressure of an inlet 80 of the dryer channel 57 because fully developed two-phase flow requires substantial vapor. The two-phase flow rate is somewhat dependent upon the physical properties of the composition, such as viscosity. However, in general, the mass flow rate of vapor should be above 39,000 kilograms per hour per square meter ($kg/hr/m^2$) (8000 pounds per hour per square foot ($lbs/hr/ft^2$)) of drying channel cross-sectional area. Thus, from this preferred vapor flow rate (and information regarding the vapor/liquid equilibrium behavior of the composition), a target temperature can be calculated to result in the flashing of the desired amount of vapor at the pressure of the channel inlet 80.

The pre-heater 54 may be a standard heat exchanger, such as one having a tube and shell or a plate and frame configuration. Although not limited to any particular design or configuration, the pre-heater 54 is preferably a tubular heat exchanger wherein heating fluid, such as steam, enters the pre-heater 54 through an inlet conduit 72 and exits the pre-heater through an outlet conduit 74, preferably, as a liquid condensate. The heated detergent paste solution exits the pre-heater 54 through a conduit 76. The temperature of the composition exiting the pre-heater 54 should be as high as possible. The maximum temperature to which the detergent composition may be heated is dependent upon the heat sensitivity of its constituents and the temperature of the available heating medium (e.g., pressurized steam). A high pre-heater temperature will result in greater amounts of vapor generated by the initial flash as the composition enters inlets to the channels 57, and will correspondingly reduce the heat necessary to dry the composition as it passes through the remainder of the dryer channels 57. Also, the higher vapor velocity entering the drying channel 57 will produce the two-phase flow necessary for uniform distribution of the inlet composition to all drying channels 57. In general, however, the detergent composition temperature should not be so high that temperature-sensitive components, such as the detergent active, begin to degrade or decompose. Preferably, the detergent composite is heated to a temperature of about 80° C. to about 250° C. and more precisely from 125° C. to 200° C.

The heated composition should be maintained under a pressure sufficient to avoid volatilization of any of the components and to ensure a single-phase flow regime throughout the pre-heater 54, the conduit 76, the inlet/distribution chamber 64, and to the restrictive device 55. Insufficient pressure will result in boiling in the pre-heater 54 and slug-flow in the conduit 76 and inlet/distribution chamber 64. The slug flow will produce uneven flow distribution in the channels 57. It is possible that in certain applications, all of the necessary drying energy can be supplied by the preheating step alone-the volatile components of the composition sufficiently being removed by flashing the composition directly into the product receiver tank 58 without a need for drying tubes 57 to supply additional heating. In most cases this is not possible because of heat sensitivity of the composition, amount of moisture removal required, and limitations on the temperature of the utility heating fluids (steam for example) employed in the pre-heater 54.

With reference to FIG. 3, to ensure even distribution of the composition into each of the dryer tubes 57, it is necessary to flow the single-phase composition into the inlet/distribution chamber 64 and through flow restrictions 78 disposed between the inlet/distribution chamber 64 and the dryer tubes 57, immediately upstream of inlets 80 to each dryer tube 57. Each flow restriction 78 defines a passage between the inlet/distribution chamber 64 and the dryer tube 57 which is smaller in cross-section than a diameter of the dryer tube 57 at its inlet 80. The flow restriction may be formed by, for example, a small tube, a nozzle, or an aperture, such as a bore hole extending through a plate, with the cross-sectional area of the void defined by the tube, nozzle or bore being smaller than the cross-sectional area of the channel defined by the dryer tube 57 (or other geometry forming the channel). In the embodiment of the invention shown in FIG. 3, the device 55a which provides for all of the restrictions 78 is an orifice plate 83 disposed between the inlet/distribution chamber 64 and each of the dryer tubes 57. The plate 83 includes a plurality of bore holes 84, the substantially cylindrical wall defining each bore hole 84 forming each flow restriction 78. The flow restriction 78 diameter preferably ranges between about 0.75 millimeters (mm) (0.03 inches) and about 2 mm (0.08 inches). The dryer tube 57 diameter preferably ranges between about 6.35 mm (0.25 inches) and about 25.4 mm (1 inch).

As the composition flows through the restrictions 78, the pressure reduces, allowing a portion of the volatile components to vaporize, increasing the vapor velocity, thus promoting two-phase flow. The sizable pressure drop produced by flashing vapor is the reason that the upstream paste flow remains as a single-phase flow with no boiling and vaporizing in the pre-heater 54, conduit 76 and inlet/distribution chamber 64. The vaporization of a portion of the volatile component as it passes through the flow restrictions 78 contributes indirectly to the flow distribution to each drying channel 57 by creating the vapor velocity necessary for two-phase flow. The low pressure drop across the drying channels 57 in the two-phase flow regime enables and promotes substantially uniform flow distribution to each drying channel 57.

To explain this further, if we designate P1 as the pressure in the inlet/distribution chamber 64, P2 the pressure at the inlet of each drying channel 57, and P3 the pressure in the product receiver tank 58, then the inlet pressure P1 to all flow restrictions 78 will be the same because of the common distribution inlet/distribution chamber 64. Also, the outlet pressure of all drying channels will be the same P3 because of the common receiver tank 58. However, the pressure P2 at the inlet 80 to each drying channel 57 will be constant only if the pressure drop through each drying channel, P2–P3, is constant. This is achieved only with two-phase flow throughout the all of the plurality of drying channels 57. If P1, P2, and P3 are the same for each drying channel, then the known fluid mechanic equations describing such flow regimes state that the flow rate will be constant in each drying channel 57.

If uneven amounts of paste solution are passed to the channels 57, such uneven distribution causes inadequate and/or uneven drying within the channels 57 and causes the channels 57 to become plugged. Channel plugging itself contributes to further uneven and/or inadequate drying of the paste solution. This is why good flow distribution is so important in a multi-channel dryer.

The composition leaving the restriction 78 passes in two-phase flow through heated channels 57 where more volatile components will vaporize and thereby force the increasingly viscous composition through outlets 86 of the channels 57 and into the collection vessel 58. Preferably the dryer channels 57 are tubes oriented in a bundle within the dryer 56, and are surrounded by a common heat transfer mechanism, such as a shared jacket 88 in which steam can be introduced. Heat transfer fluid, such as steam, flows into the jacket 88 through a conduit 90, and steam and/or condensate flows out of the jacket through a conduit 92. The length, internal diameter, thickness, and material of construction of the dryer channels 57 are selected to achieve adequate drying of the composition and to produce a dry material having a desired moisture content. Each dryer tube 57 preferably has an inside diameter of about 6.35 mm (0.25 inch) to about 25.4 mm (1 inch) and has a length of about 3 meters (10 feet) to about 18 meters (60 feet), preferably about 9 meters (30 feet). However, it is noted that other embodiments of the invention may employ channels or conduits having equivalent diameters as defined in Table 5–8 of PERRY'S CHEMICAL ENGINEERS' HANDBOOK, 5–25 (6th ed. 1984)(see also, 7th ed. 1997 at 6–12 to 6–13). Furthermore, the channels, tubes, or conduits may be tapered to ensure a gradual increase in gas velocity as the composition becomes drier.

It is believed that uniform distribution of composition through the dryer tubes 57 is aided by the use of the heat jacket 88. For example, if a tube 57 begins to clog, there will be a reduced flow of composition into that tube. This in turn reduces the pressure drop across the bore hole 84 through which the composition is fed into the tube 57 and increases the pressure drop within the tube 57. Because the walls of the tube 57 are heated at a substantially constant rate, pressure will increase at the entrance of the clogged tube 57 until vapor pressure upstream of the clog is sufficient to blow the tube 57 clear and re-establish two-phase flow at the tube inlet 80.

The motive force for driving the composition through the entire length of the drying channel 57 is dependent on the velocity of vapor in the drying channel 57. If the vapor velocity is too low, it will not sustain the desired two-phase flow. As stated above, minimum velocities are somewhat dependent upon the physical properties of the composition, such as viscosity. However, in general, the mass flow rate of vapor should be above 39,000 kg/hr/m$^2$ (8000 lbs/hr/ft$^2$) of drying channel cross-sectional area.

Steam and/or other types of vapor means may be introduced into the inlet/distribution chamber 64 via a conduit 94 into a common steam header 96 and then into each channel inlet 80 through a flow restriction 98. This will increase the motive force used to propel the composition through the restrictions 78 and drying channels 57. Simultaneous steam injection is particularly useful to prevent plugging of the channels 57 during start-up and shut-down. Simultaneous steam injection also may be useful when drying heat-sensitive materials that cannot be superheated to elevated temperatures. It also is useful when drying at reduced flow-rates. Where sufficient flashing occurs within the channels 57, however, simultaneous steam injection is unnecessary. A major disadvantage of steam injection is that it reduces the energy efficiency of the process.

As discussed above, FIG. 3 shows an embodiment of the invention wherein the flow restriction device 55a is the orifice plate 83 located at the drying channel entrance with bore holes 84 drilled at the entrance to each drying channel 57. Somewhat better temperature—pressure equilibrium can be achieved in some applications by using the restriction device 55b shown in FIG. 4 which includes two orifice plates 100 and 102. The orifice plates 100 and 102 provide for a plurality of flow restrictions arranged in series upstream of each dryer tube 57. Specifically, with reference to FIG. 4a, a first restriction 105 and a second restriction 106 are disposed in series separated from each other by a gasket 108. Each flow restriction 105, 106 and the gasket 108 defines a bore hole. Each bore hole 109 of the first flow restriction 105 is in fluid communication with at least one bore hole 110 of the gasket 108 and a bore hole 112 of the second restriction 106, and at least one dryer tube 57. In order to provide a flow restriction, the diameter of each bore hole 109 and 112 is smaller than the inner diameter of the tubes 51. Preferably, and as shown in FIG. 4, the bore holes 109 and 112 also are smaller than the diameter of the gasket bore hole 110. Exemplary diameters of the restriction bore holes 109, 112, the gasket bore hole 110 and the inner diameter of the tube 57 are 1.6 mm (0.0625 inches), 12.7 mm (0.5 inches), and 12.7 mm (0.5 inches), respectively. Based on the relative diameter sizes a chamber 114 is disposed between each two restrictions 105, 106. The top and bottom portions of the chamber 114 are defined by the first and second restrictions 105 and 106, respectively, and sidewalls 116 of the chamber 114 are defined by the thickness of the gasket 108.

Figure 4A:
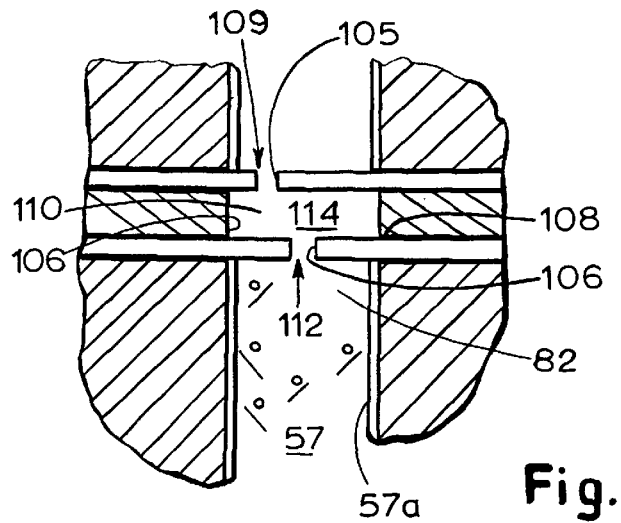
FIG. 4A is an enlarged view of a portion of the embodiment of the apparatus shown in FIG. 4.

As shown in FIGS. 4 and 4A, the restrictions 105, 106, and the bore holes 109, 112 therein are not aligned with each other; but instead, have center axes that are staggered about 3 mm (0.125 inches) off of the centerline. Thus, the flow of the composition through the restrictions 105 and 106 is "snake-like" and not a straight line. This is believed to help in providing a sufficient back-pressure in the upstream conduit 76 and the pre-heater 54. As the heated, single-phase composition passes into and through the first restriction 105, a two-phase flow exits into the chamber 114. As the two-phase flow exits the chamber 114 and passes into the second restriction 106, more volatile components are flashed and a more voluminous two-phase flow exits into the inlets 80 of the dryer tubes 57. The onset of the two-phase flow phenomena is the same as that detailed above with respect to the single restriction dryer design shown in FIG. 3 and similarly provides for sufficient back pressure and sufficient pressure drop to generate maximum flash, and even distribution of flow throughout the multiple channels 57.

Sufficient back pressure is achieved since the flow of paste is greatly restricted as it enters and passes through the flow restriction device 55b. A sufficient pressure drop through the flow-restriction devices 55a and 55b is due in large part to what is known as "velocity head" pressure loss. Prior to entering a flow restriction, a paste may be in the form of a single-phase liquid-gel. As the single-phase paste passes through the flow restriction 78 or flow restrictions 105 and 106, part of the paste volatilizes to a foam-like, two-phase material due to a pressure drop (for example, about 3 bar (45 pounds per square inch (psi)) to about 15 bar (225 psi)) experienced as the material flows through the restriction. The rapid increase in velocity results in the "velocity head" pressure loss—the pressure loss necessary for maximizing vaporization of the solvents from the paste. A sufficient velocity head pressure loss may be attainable in most instances simply by using a single orifice plate 83 as shown in FIG. 3 instead of dual orifice plates 100 and 102 shown in FIG. 4. As mentioned above, other suitable restrictive devices include convergent nozzles, divergent nozzles, convergent and divergent nozzles, small diameter injector tubes and other shapes that can be manufactured with identical flow geometry. The orifice size in all of these devices must be small enough to produce sufficient two-phase flow velocity for the required back pressure and will also depend on the desired flow-rate to each orifice.

Even flow through each channel 57 is ensured by keeping the pressure drop constant across each channel 57. In this way, the flow restrictions 105 and 106 are evenly distributing the flow to a point of even pressure in each drying channel inlet. The constant pressure drop in each drying channel 57 can only be maintained if two-phase flow exists across the entire length of the channel 57. The combination of the pre-heater 54 and flow restrictions 78 (or 105 and 106) work together to indirectly produce the desired uniform flow distribution. It is noted that traditional flashing of a material through an orifice will only distribute flow evenly if it is flashing to a common chamber at constant pressure, which is not the case in this invention. The drying channels 57 lie between the flow restriction and the common receiver vessel 58. Therefore, achieving conditions for two-phase flow regime in all drying channels in combination with a common chamber at the end of each channel 57, enables essentially constant inlet pressure at the inlet of each drying channel 57 and therefore the distribution is uniform.

Once a flow restriction 78 (or 105 and 106) is installed, it does not need to be replaced each time a different back pressure is desired. The amount of back pressure generated by the installed restriction can be adjusted by varying certain operating conditions throughout the process. For example, the variables governing the pressure drop across a given flow restriction include both the flow rate and temperature of the feed composition. To achieve the relatively high pressure drop required to prevent flashing in the pre-heater 54, the cross-sectional area of the orifice in the restriction must be small enough so that when the liquid flashes to two phases, the vapor velocity is high enough to result in the desired pressure drop. The higher the temperature of the feed composition, the higher vapor velocity and, thus, the higher the pressure drop across the flow-restriction. Recall, that the temperature of the feed composition is controlled by the upstream pre-heater 54. If the composition is not superheated in the preheater 54, no flashing will occur in the flow restriction and the pressure drop will be relatively low.

As the detergent composition flows through the flow restriction 78 (or 105 and 106), the pressure is reduced and the volatile components of the composition begin to flash. The vapor liberated during this flashing acts as a motive force to propel the remainder of the composition through the dryer tubes 57. The absolute pressure within the channels 57 of the dryer is selected by controlling, among other things, a vent 61 of the dryer 56 so that a desired vaporization occurs. The pressure drop across the channels 57 when operating in two phase flow is relatively low in most cases, and will range between 0.5 bar (7.5 psi) to 2.0 bar (30 psi).

As the remainder of the composition passes through the channels 57 of the dryer 56, heat transferred through the walls 57a of the tubes 57 vaporizes the volatile components of the composition. The velocity of the two-phase liquid/vapor mixture increases as the vapor is liberated and as the pressure drops. The propellent (including the flashing solvents and steam or other propellent that may be added via the conduit 94) and the particles of the composition mix to form the two-phase flow shown in FIGS. 1D and 1E. Since the process can be operated at various pressures, typically under vacuum by controlling the flow of the vapor through the vent 61, the gas velocity exiting the channels 57 preferably is maintained at between about 15.25 meters per second (m/sec) (50 feet per second (ft/sec)) and about 460 m/sec (1,500 ft/sec). The high two-phase flow velocity and turbulent flow in the dryer channels 57 maximize the heat transfer through the walls 57a of the channels 57.

The temperature at the restriction inlet is used to control the amount of flash. The temperature of the restriction inlet, therefore, should be high enough to generate vapor flashing sufficient to propel the paste through the restriction and channel into the receiver tank without plugging the channel. Inlet temperatures and their relationship to the amount of flash generated are dependent, of course, on the particular composition and, the heat sensitivity of the composition. The dryness of the product is controlled primarily by the temperature of the heating fluid in the dryer jacket 88. This temperature may also be limited by the heat sensitivity of the product. Hence each different composition may require a different set of dryer operating conditions.

As the two-phase flow exits the dryer 56, the vapor and concentrated particles are separated. The vapor is passed through the vent 61 and, optionally, to a vacuum system 122. The concentrated particles are collected in the vessel 58 located at the exit of the channels and is removed from the vessel 58 through an outlet conduit 124 utilizing a pump, plodder, extruder or other device 60. The vessel 58 preferably operates at a pressure less than an operating pressure of the channel outlets, and most preferably operates under vacuum, such as, for example, a pressure of about one bar absolute or less. Operating the vessel 58 under such reduced pressure and/or vacuum conditions enables easy separation of vapor and concentrated particles.

From the outlet conduit 124, the concentrated dry product may be subjected to various unit operations known in the art in order to produce a final product. In many cases, the hot product discharged from the dryer 56 is very sticky or even molten in form, and before performing any additional operations, it must be cooled. One method for accomplishing this is to extrude the material as small diameter strings and pass pre-cooled air either co-currently or counter-currently through them. Another method of cooling the product is to pneumatically convey it through a conduit with a stream of pre-cooled air. Yet another method to cool the product is to spread it onto the surface of a metal belt, where chilled coolant, such as water, is sprayed onto the underside of the belt. As the chilled belt is moving around a set of rollers the cooled product is removed from the discharge end. Yet another method for cooling the product is to spread it on the outer surface of a rotating drum that is cooled from the inside by a cooling means. It may be beneficial to use a combination of the aforementioned methods for cooling the product. The conditioned granules then can be ground and admixed with other materials by various grinding-mixing-agglomeration methods to form a finished compact product granule of desired composition and properties.

Figure 5:
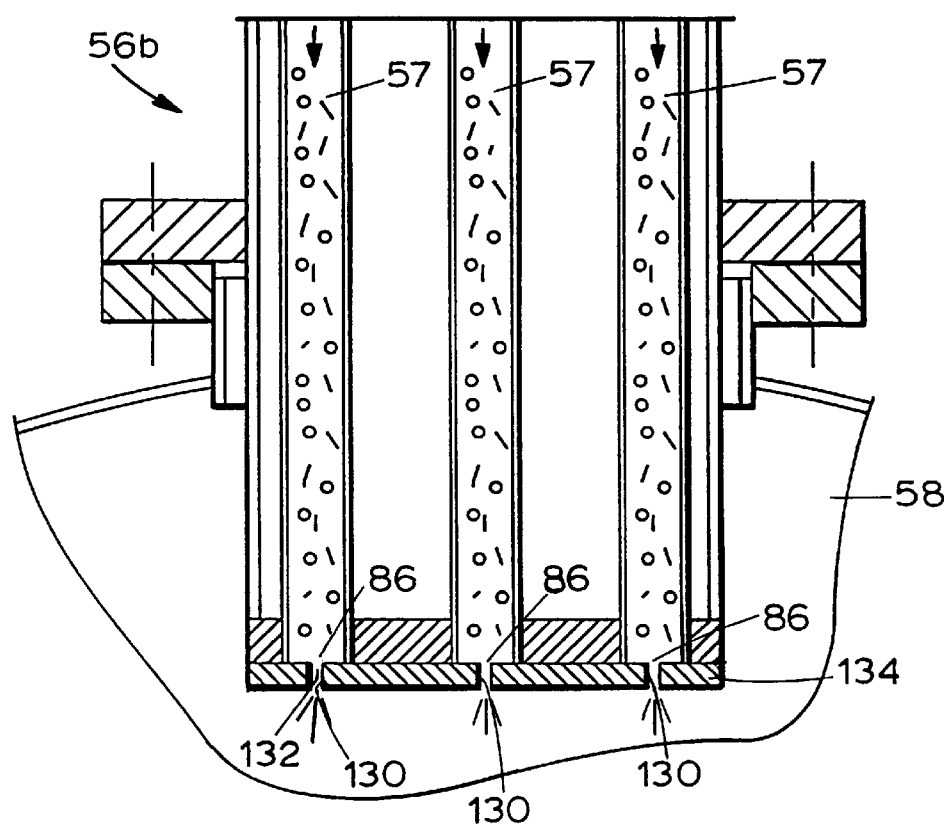
FIG. 5 is a partial, sectional view of the embodiment of the apparatus shown in FIG. 4.

Another method and apparatus of the invention useful in minimizing channel plugging, referred to as "staged-flashing" is shown in FIG. 5. Staged-flashing involves the use of additional flow restrictions 130 formed, for example, by drilling bores 132 in an orifice plate 134 positioned at the outlet 86 of the dryer channels 57. Although FIG. 5 is described herein as a portion of the dryer 56b shown in FIG. 4, the additional flow restrictions 130 also may be placed in the dryer 56a shown in FIG. 3. Each flow restriction 130 cooperates with a single dryer tube 57. Staged-flashing is useful in drying certain materials that become extremely viscous when partially dry, such as alpha olefin sulfonate (AOS) pastes, which are primarily a blend of $C_{16}$ and $C_8$ alpha olefin chain lengths, which become more fluid at elevated temperatures. This material is typical of many materials that become viscous and cake while drying, which leads to plugging of drying channels. By installing a flow restriction at both the inlet and outlet ends of the drying channel 57, the total moisture removed by the flash will remain the same, but will be divided between these two locations. The relative amounts in each flash will depend on the ratio of pressure drop in each restriction. The main function of the outlet restrictions 130 shown in FIG. 5 is to increase the operating pressure of the drying channels 57, which in turn increases the equilibrium temperature in the drying channels 57. The liquid content in the drying channels 57 also are greater, due to the partial flash through the inlet restrictions 78 (or 105 and 106). The combination of higher temperature and moisture content reduce the viscosity of the composition in the dryer channel, which promotes two-phase flow and prevents plugging problems.

The drying processes and apparatus according to the invention may be used to form dry concentrated detergent from feed materials having a wide range of viscosities. For example, a heated material fed to the dryer 56 may range from a thin paste (approximately 50 centipoise) to a very thick paste (approximately 500,000 centipoise). Furthermore, the apparatus and process are suitable for drying large amounts of plastics, food stuffs, pharmaceutical products, high molecular weight organic compositions that become soft and flowable at elevated temperatures, and materials that become increasingly viscous as solvents are removed therefrom. The apparatus and process are also suitable for drying organic and inorganic compounds that form discrete particles at elevated temperatures. The apparatus and process are especially useful for removing solvents from large volumes of detergent pastes in the manufacture of detergent concentrates.

Table 1, below, shows approximate drying conditions based on an average for many different compositions, using a multi-tube dryer with three tubes, each tube having an inner diameter of about 10.7 mm (0.42 inches) and a length of about 9 meters (30 feet).

TABLE 1

| Process Parameter | Range | Average |
| --- | --- | --- |
| Water Evaporation Rate (kg/hr/tube) | 2.3 to 9.1 | 5.4 |
| Minimum Vapor Flow (SCFM at 70° C.) | 1.5 to 2.5 | 1.8 |
| Pre-heat Temp. (° C.) | 150 to 200 | 160 |
| Pre-heat Temp. (Heat-sensitive) (° C.) | 100 to 140 | 130 |
| Jacket Steam Temp. (° C.) | 140 to 220 | |
| Jacket Steam Temp. (Heat-sensitive) (° C.) | 100 to 140 | 125 |
| Receiving Tank Temp. (° C.) | 70 to 120 | 90 |
| Δ Pressure across inlet restriction (bar) | 3 to 10 | 8 |
| Δ Pressure across dryer tubes (bar) | 0.5 to 2.0 | 1.0 |
| Δ Pressure across secondary restriction (bar) | 0.5 to 2.0 | 0.8 |
| Receiver Tank Pressure (bar absolute) | 0.13 to 1.013 | 0.160 |

The inventive processes provide a number of significant improvements and advantages over conventional drying processes. For example, the vapor liberated during the process and the pressure gradient in the dryer serve the dual functions of propelling the more dry composition through the dryer channels and of increasing the heat transfer rate to the composition. Thus, processes of the invention may obviate the need for costly conventional process equipment for conveying a detergent paste through a drying system and agitating the paste to provide adequate heat transfer.

Another advantage of the inventive processes is that the high two-phase flow velocities resulting therefrom also minimize the average residence time of the composition (and any temperature-sensitive constituents therein) in the dryer and, therefore, prevent the formation of stagnant or slow-moving films. This, in turn, minimizes chemical and physical degradation of the temperature-sensitive constituents.

Furthermore, another advantage of the inventive processes is that the temperature of the dryer channels can be maintained below the temperature at which the detergent active degrades by controlling the pressure within the dryer channels, which are typically operated under vacuum. Because of the high two-phase flow velocity and the operating pressure, the temperature of the heat transfer surface of the dryer jacket can be increased, which in turn increases the rate of heat transferred to the detergent paste.

Still further, another advantage of the inventive processes is the ease in manipulating process variables to accommodate the removal of selected volatile components from a variety of different feed compositions. For example, the temperature of the feed or channels, the pressure drop through the flow restriction and the dryer channels, and/or the amount of additional vapor or vapor-generating materials injected in the drying system 50 may be selected to remove a single volatile component from a composition. This may be desirable, for example, in the processing of sodium alpha sulfo methylester, which may be produced using a low molecular weight alcohol, such as methanol. A drying process according to the invention may be used to selectively remove the methanol from the detergent paste. The methanol may then be recycled to a methylester sulfonating process and the semi-molten active paste leaving the dryer may be used as a feed stream to a liquids blending operation to form a liquid detergent.

EXAMPLES

The invention is further described and illustrated by the following examples which are not intended to be limiting. Each of the examples employed a start-up procedure similar to the one detailed in subpart C of Example 1 below in view of the steady-state conditions given in Table 2 for the particular experiment.

Example 1

This example illustrates the drying of a fatty alcohol sodium sulfate and illustrates the procedures for successful start-up and operation of a dryer according to the invention, providing steady-state operating conditions for two drying experiments on the same composition, and corresponding product analysis.

A. Composition

A fatty alcohol sodium sulfate composition (also known as a fatty alcohol sulfate, sodium salt) was prepared in a continuous process from a natural lauryl alcohol (primarily $C_{12}$ homolog blended with a small amount of $C_{14}$). This composition was in the form of a viscous paste. Because such pastes exhibit a "localized minimum" viscosity when the sulfate concentration is near 70 wt. %, the paste used in this example had a sulfate range of between about 65 wt. % and about 75 wt. %. Thus, the aforementioned active matter (i.e., sulfate) concentration range was characterized by a relatively low viscosity at normal processing conditions, compared to concentrations outside the range.

Fatty alcohol sodium sulfate pastes exhibit shear-thinning characteristics. Furthermore, such pastes are heat sensitive. At temperatures above about 140° C. they may undergo an undesirable reversion reaction as shown below:

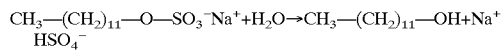

The above reversion reaction is acid catalyzed. Thus, poor neutralization of the paste can lead to an unstable product that undergoes the above reversion reaction. Also, exposing the paste to temperatures above 140° C. for a sufficient time results in reversion, releasing acid and potentially accelerating the above reversion reaction at a rate faster than excess base in the mixture can neutralize the composition. Thus, the reversion action, if unchecked, results in a waste material of no value. Because of this complex relationship of the materials of this paste, it was chosen to test methods and apparatus of the invention.

B. Apparatus

Two runs (Example 1A and 1B) were conducted to illustrate the drying of the fatty alcohol sodium sulfate composition. The apparatus used for Example 1A is similar to the embodiment shown in FIGS. 2, 4, and 4A, with the modification that four restrictions in series were used instead of the two restrictions 100, 102 shown in FIGS. 4 and 4A. The apparatus used for Example 1B is shown in FIGS. 2, 4, and 4A.

C. Start-Up Procedure

The fatty alcohol sodium sulfate composition was loaded into the feed tank 62 where the slow-turning, wall-wiping agitator 66 was used to improve the heat transfer and fluidity at the tank wall. Care was taken not to undesirably aerate the composition. The composition was maintained at a temperature of about 60° C. to about 70° C., preferably about 67° C., by means of a hot water jacket or heat-tracing (not shown) provided on the tank 62. A flow of the composition was established in a recycle loop back to the tank to enable the flow control system to stabilize at a preferred feed rate. The flow of the composition for a particular dryer design determines the loading (mass flow rate of paste per drying channel). The dryer configuration and design that was the subject of these examples included three identical dryer tubes 57. The selected load for the examples was typically in the range of about 10 kilograms per hour per tube (kg/hr/tube) to about 50 kg/hr/tube, preferably 15 kg/hr/tube to about 35 kg/hr/tube.

A supply of steam regulated to a desired pressure was fed to a utility side of the pre-heater 54 to warm the pre-heater 54 to operating conditions. The same regulated steam was fed through the heating jackets or tracing (not shown) on the process piping downstream of the pre-heater 54 to the steam inlet 90. It was desired to heat this composition to a temperature of about 135° C. for the start-up, thus the steam temperature was at least about 135° C., preferably about 145° C., depending on the efficiency of heat transfer in the pre-heater 54. A supply of steam regulated to a second desired pressure was fed through the dryer heating jacket(s) 88 to maintain a temperature at the surface of each of the tube walls 57A of, for example, about 120° C. (during start-up) to about 130° C. (during steady state operation). Hot water at a desired temperature of, for example, about 50° C. to about 80° C., was supplied through the various heat tracing and heating jackets of the remaining process piping, the receiving vessel 58, and the discharge device (e.g., plodder) 60. Cooling water was fed to a condenser (not shown) on the vapor outlet line 61.

A vacuum system 122 was started up and the pressure in the receiving tank 58 was set to the desired condition, such as, for example, about 0.27 bar absolute (about 200 mm Hg absolute) to about 0.53 bar absolute (400 mm Hg absolute). To establish a vacuum in the receiver tank 58, the discharge device (e.g., plodder) 60 was preferably sealed by, for example, a flexible elastomeric sheet (not shown) disposed over extrusion holes in the device 60.

A start-up sequence included the step of setting a control valve 140 on the conduit 76 to a position that would imitate the back pressure of the dryer inlet during normal, steady state operation, such as, for example, 4.0 bar gauge (400 kilopascals gauge (Kpag) or 58 pounds-force per square inch (psig)). The single-phase composition flow was initiated through the dryer inlet by opening the control valve 140 in the conduit 76. The temperature of the single-phase composition exiting the pre-heater 54 was checked to ensure that the temperature was within the desired range of about 130° C. to about 135° C., and the steam supply pressure to the pre-heater 54 was adjusted, if necessary, to achieve the desired outlet temperature. The pressure in the second conduit 70 was observed as the paste filled the pre-heater 54 and the conduit 76. As the pressure began to increase rapidly above about 6.9 bar guage (about 690 Kpag or about 100 psig), the control valve 140 in the conduit 76 was opened, thereby allowing the single-phase composition to flow into the discharge chamber 64 of the dryer.

The back pressure was transferred from the control valve 140 at the dryer inlet to a natural back pressure produced by the flow and distribution of the composition through flow restrictions (identical or similar to flow restrictions 83) and into the dryer tubes 57. The control valve 140 was fully opened and the single-phase flow composition began to flash into the across the flow restrictions into the dryer tubes 57. The vapor liberated by the flashing composition initiated a two-phase flow and exerted a large pressure drop as the composition passed through bore holes defined by the restrictions. This forced a uniform distribution of the two-phase flow to all available dryer tubes 57. Successful start up of the dryer depended upon a variety of factors discussed above and, importantly, depended upon achieving a sufficient initial flash to force a uniform distribution of the two-phase flow to all available dryer tubes 57.

A receiving tank wall wiper 142 was started as material began to collect in the tank 58. After about five minutes of operation, the plodder 60 was started at a low discharge rate. As dried product accumulated in the receiving tank 58, screws in the plodder 60 filled and began to push dried product out through the extrusion holes in a discharge end of the plodder 60. The filled screws then sealed the outlet against the receiver tank vacuum.

The dryer conditions were adjusted to achieve a dried product having a desired final moisture content by adjusting the temperature of the dryer jacket 88 and/or the vacuum in the receiving tank 58. For example, to reduce the moisture content below about three percent by weight based on the weight of the dried product, the jacket temperature was increased to about 130° C., and the vacuum was increased to a pressure of about 0.113 bar absolute (about 85 mm Hg absolute) to about 0.127 bar absolute (about 95 mm Hg absolute) in a series of steps over a time period of about 30 minutes to about 45 minutes.

D. Drying Operation and Results

During continuous operation, the dryer reliably maintained its performance provided that steady state was maintained through control of the temperatures, flow rates, and critical pressures. A full description of the processing conditions and characteristics of the product are provided in Table 2 below.

Product extruded from the plodder 60 was still molten (e.g., having a temperature of about 60° C. to about 75° C.) and formed a non-tacky solid upon cooling to a temperature of about 30° C. when the final moisture content was below about three wt. % to about five wt. %. This cooled product was a relatively crystalline solid which could be ground to a powder form, or prepared as needles, flakes, or other desired shapes. See Table 2 below for analytical data on the products obtained in the various process examples.

As noted above, two runs with the fatty alcohol sodium sulfate paste were conducted and are identified in Table 2 below as Examples 1A and 1B. In Example 1A, the paste was agitated in the feed tank 62 and, therefore, was aerated. This resulted in much greater pressure drops in the feed system, due to entrained air bubbles. In Example 1B, the paste was not agitated in the feed tank 62, and, consequently, was not aerated. Accordingly, the pressure drop in Example 1B was much lower. An additional reason for the lower pressure drop in Example 1B could be attributed to the use of two orifice plates 100, 102 in series upstream of each tube 57 as opposed to the four restrictions used in series in Example 1A. Other differences in the two runs include the addition of ammonia to the paste in Example 1B which was stripped upon drying and the use of a feed temperature as high as 139° C. in Example 1B.

The final moisture content of the dried product according to Example 1A was 2.37 percent by weight based on the weight of the product. The final moisture content of the dried product according to Example 1B was 1.57 percent by weight based on the weight of the product. Other product data also are presented in Table 2 below.

Example 2

This example illustrates the drying of the same fatty alcohol sodium sulfate paste as in Example 1, illustrating the consequences of improper start-up and operating conditions. Specifically, it shows the importance of establishing two-phase flow immediately downstream of the flow restriction.

A. Composition

The fatty alcohol sodium sulfate paste used in Example 1 also was used for this example.

B. Apparatus

The apparatus used in this example is identical to the one used in Example 1A.

C. Drying Operation and Results

See Table 2 for the process parameters used for this example. It is believed that a failure to maintain a sufficient temperature into the inlet chamber of the dryer and tubes 57 led to an insufficient flash through the flow restriction, led to a non-uniform distribution of material flow into the dryer tubes 57 and, consequently, plugging of one of the three dryer tubes 57 with the paste. Given the tendency of fatty alcohol sodium sulfate to degrade and/or decompose upon prolonged exposure to heat, any paste that was trapped in the blocked tube 57 decomposed. The load on the two unplugged tubes 57 increased from 33% to 50% of the total paste flow to the dryer. The excessive load on the two tubes 57 could not be dried to a desired moisture content. Because this operation failed to achieve a stable steady-state, product data are not available for this run.

Example 3

This example illustrates the use of staged flashing to dry an alpha olefin sodium sulfonate feedstock.

A. Composition

This example illustrates the drying of a $C_{14-18}$ alpha olefin sodium sulfonate (AOS) feedstock ($C_{14-18}$ GULFTENE, available from Chevron Chemical Company, Houston, Tex.). The AOS feedstock contained a blend of alpha olefin homologs, the blend comprising about 15 wt. % of $C_{14}$, about 55 wt. % of $C_{16}$, and about 35 wt. % of $C_{18}$ based on the total weight of the AOS feedstock. The feedstock was sulfonated, hydrolyzed, and neutralized to a starting paste composition as detailed in Table 2 below.

B. Apparatus

This example illustrates the use of a secondary restriction device 122 at the discharge end 86 of the dryer 56b. The apparatus for this example was identical to the one shown in FIGS. 2, 4, 4A, and 5.

A very high temperature was used to preheat the AOS feedstock in order to provide sufficient energy for the initial flash through a primary restriction (having two orifice plates in series) into the dryer tubes 57. The vapor liberated in the initial flash, however, caused rapid cooling of the residual composition as the composition passed through the dryer tubes 57. (This rapid cooling posed a problem when an attempt was made to dry this material in a dryer which did not have a secondary restriction device since the partially dried composition in the inlet to the drying tubes 57 was cooled so much that a sticky, semi-solid film formed and stuck to the walls 57A of the tubes 57 and, consequently, caused the tubes 57 to plug.) It was determined that the partially dried AOS paste would melt and remain fluid at temperatures only slightly higher than those experienced after the initial flash. Since the cooling was caused by the initial flash drying, the pressure in the upper portion of the dryer tubes 57 (i.e., that portion of each tube immediately downstream of the restrictive orifices) determined how much flash cooling would occur. It was determined that the pressure in this portion of the tubes 57 could be increased by using secondary restrictions 130 at the discharge end 86 of the dyer tubes 57. Accordingly, because of the secondary restrictions 130, the pressure throughout the dryer tubes 57 was increased and the pressure drop across the upstream flow restrictions was reduced.

Based upon the volume of vapor at the outlets to the dryer tubes 57, it was determined that the bore hole 132 of the secondary restrictions 130 could be larger than the orifice bore of the primary restriction device. Each of the bore holes of the primary restrictions 100, 102 had a diameter of 0.794 mm (0.03125 inches), whereas the orifice bore of the secondary restriction device had a diameter of 2.37 mm (0.0933 inches). Steam injection through the steam injection line was not necessary since the initial flash provided sufficient vapor to propel the composition through the tubes.

C. Drying Operation and Results

A full description of the steady-state processing conditions and the obtained product are provided in Table 2 below. During the run, the pressure drop across the primary restriction was about 5 bar (75.5 psi), while the pressure loss across the drying channel and secondary restriction device was 2.4 bar (34.67 psi). The dryer jacket 88 was heated to above 160° C. to help keep the drying composition fluid.

Example 4

This example illustrates the drying of a food and beverage additive, often used in beer processing, which traditionally has been dried using a wiped film evaporator.

A. Composition

A commercially-available sodium gluconate (SG) feedstock having a water content of about 42 wt. % was used for this example.

B. Apparatus

This example demonstrates the use of steam injection in drying the SG material. Example 4A is the example run that did not use steam injection and Example 4B is the example run that did use steam injection. The apparatus used in Example 4A and 4B is similar to the one shown in FIGS. 2 and 3 with the exception that a discharge device was not used. It is noted that a positive displacement pump with a steam jacket would be a suitable replacement for the plodder shown in the drawing figures.

C. Drying Operation and Results

See Table 2 for a full description of the steady-state processing conditions and the product obtained in this example. A relatively small pressure drop across the restriction device at the inlet of the dryer tubes was observed in Example 4A, and sufficient drying was achieved. The final moisture content of the product obtained in Example 4A was about 3 wt. %.

The use of steam injection in Example 4B increased the pressure drop across the restriction device, however, the end product had a higher moisture content than that of Example 4A. In Example 4B, the product discharged from the dryer was a pumpable molten fluid that hardened to a brittle mass upon cooling to room temperature. Thus, the use of steam was found to be of no benefit for drying this material.

Example 5

This example illustrates the drying of a non-ionic surfactant derived from sugar.

A. Composition

An alkyl polyglycoside (APG) feedstock material, which is commercially-available under the name GLUCOPON 625 FE from Henkel Kommanditgesellschaft auf Aktien of Dusseldorf, Germany was dried in this example. Based on information found in the manufacturer's data sheet, the APG feedstock material comprises 40 wt. % of the alkyl polyglycoside, 51.9 wt. % water, and 6 wt. % ethanol. Furthermore, the APG feedstock is a thermally stable material at the drying conditions used in this example.

B. Apparatus

The apparatus used in this example is identical to the one used in Example 1B, and is shown in FIGS. 2, 4, and 4A.

C. Drying Operation and Results

A full description of the processing conditions and characteristics of the product are provided in Table 2 below. The APG feedstock was successfully dried using injection steam at 1.36 kg/hr/tube and also without the use of injection steam. The obtained product was discharged from the tubes 57 as a pumpable molten fluid that hardened to a solid mass upon cooling to room temperature. The final moisture content of the dried, solid product obtained without the use of steam injection was 3.2 wt. % while the moisture content of the product obtained with the use of steam injection was 3.6 wt. %.

Example 6

This example illustrates the drying of a non-detergent organic polymer.

A. Composition

A sodium polyacrylate (SPA) feedstock material, was obtained for this example (commercially-available under the tradename ACUSOL® 445N from Rohm & Haas of Philadelphia, Pa.). Based on information available in the manufacturer's data sheet, the SPA feedstock material comprises 45 wt. % solids and 55 wt. % water. (A dried SPA product also is commercially-available from Rohm & Haas, the product having a moisture content of 11 wt. %.) Furthermore, the SPA feedstock is a thermally stable material at the drying conditions used in this example.

B. Apparatus

The apparatus used in this example is similar to the one used in Example 1A with the exception that a discharge device was not used. It is noted that a rotary air-valve and pneumatic conveyance device may be used in lieu of the plodder shown in the drawing figures.

C. Drying Operation and Results

A full description of the processing conditions and the characteristics of the dried product are provided in Table 2 below. The product was discharged from the dryer tubes 57 as a low density, puffed solid that easily could be ground and pneumatically conveyed. A rotary valve was used to seal the receiving tank 58 for vacuum. The final moisture content of the dried, solid product was 10.6 wt. % which is a dryer product than that commercially sold by the same supplier.

Example 7

This example illustrates the drying of a material utilized in laundry powder formulations.

A. Composition

A linear alkyl benzene sodium sulfonate (LABS) and sodium silicate, an inorganic salt commonly used in laundry powder formulations was dried in this example. This mixture represents the common "wet" components in laundry detergent powder formulations. The dried product obtained from this example can be used with other dry ingredients in agglomeration operations to form a final laundry detergent product. The feedstock to be dried comprises 50.6 wt. % LABS, 16.8 wt. % sodium silicate, and 30.7 wt. % water. The feedstock was prepared in a Chemithon high active neutralizer. A Witco linear alkylbenzene sulfonic acid product and a typical liquid di-silicate ($SiO_2/Na_2O$ ratio of 2.0, 44% aqueous solution) were mixed and neutralized with 50% caustic soda.

B. Apparatus

The apparatus used in this example is identical to the one used in Example 1B, and is shown in FIGS. 2, 4, and 4A.

C. Drying Operation and Results

A full description of the steady-state processing conditions and characteristics of the product are provided in Table 2 below. The feedstock was successfully dried to form a dry product having a moisture content of about 2.75 wt. % based on the total weight of the product. The product was a highly viscous paste that could be agglomerated with other dry ingredients to form a finished laundry detergent powder formulation. Drying only the "wet" components (i.e., about 20–30 wt. % based on the total weight of the feedstock) substantially reduces energy and installed costs needed to spray dry the entire formulation.

TABLE 2

| Example No. | 1a | 1b | 2 | 3 | 4a | 4b | 5 | 6 | 7 |
|---|---|---|---|---|---|---|---|---|---|
| Feed Rate (kg/hr) | 54.42 | 54.42 | 54.42 | 54.42 | 68.03 | 68.03 | 54.42 | 54.42 | 34.0 |
| Loading (kg/hr/tube) | 18.14 | 18.14 | 18.14 | 18.14 | 22.67 | 22.67 | 18.14 | 18.14 | 11.3 |
| Inject Steam (kg/hr/tube) | 1.36 | 1.5 | none | none | none | 1.36 | 1.36 | none | none |
| Temperatures (° C.): | | | | | | | | | |
| Feed in Tank 62 | 67.4 | 60 | 67 | 93.7 | 45 | 70 | 63.3 | 61 | n.a. |
| Steam To Pre-heater 54 | 149 | 145 | 129 | 175.5 | 130 | 140 | 165 | 174 | 165 |
| Feed In Pre-heater 54 | 67.3 | 62.6 | 68 | 89 | 47.4 | 74 | 63.5 | 62.1 | n.a. |
| Feed Out Pre-heater 54 | 136.4 | 139.4 | 113 | 173.9 | 130 | 131 | 155 | 165.2 | 156 |
| Feed In Flow Restriction | 135.8 | 139 | 115 | 171 | 121 | 135 | 155.2 | 163.3 | n.a. |
| Feed Out Flow Restriction | n.a. | 104 | n.a. | n.a. | 115 | 119 | 103.7 | 155.6 | 170 |
| Steam To Dryer Jacket | 132 | 130 | 128 | 163.8 | 151 | 142 | 176 | 174 | 180 |
| Vapor To Condenser | 72.6 | 84.1 | 44 | 88.8 | 111 | 104 | 119 | 44 | 102 |
| Receiver Tracing | 68.2 | 83.5 | 78 | 135.5 | 134 | 121 | 125 | 127 | none |
| Pressures (bar absolute): | | | | | | | | | |
| Feed In Pre-heater 54 | 25.8 | 11 | n.a. | 16.9 | 2.5 | 3.35 | 7.3 | 6.9 | n.a. |
| Feed Out Pre-heater 54 | 1.8 | 5.1 | 3.6 | 13.1 | 2.2 | 2.95 | 7.1 | 6.5 | 28.6 |
| Feed To Flow Restriction | 6.4 | 3.8 | 3.0 | 7.7 | 2.2 | 2.4 | 7.1 | 6.5 | n.a. |
| Feed Out Flow Restriction | .94 | .94 | see* | 2.5 | 1.7 | 1.7 | 1.4 | 5.9 | n.a. |
| Receiver Tank 58 | 0.113 | 0.127 | 0.117 | 0.140 | 0.269 | 0.197 | 0.217 | 0.093 | 0.049 |
| Equipment Used: | | | | | | | | | |
| Flow Restriction | | | | | | | | | |
| Flow Rest. Bore Size (mm) | 1.5875 | 1.5875 | 1.5875 | 0.79375 | 1.0414 | 1.5875 | 1.5875 | 1.0414 | 1.5875 |
| No. of Flow Rests. in Series | 4 | 2 | 4 | 2 | 1 | 1 | 2 | 4 | 2 |
| Double Flash Orifice? | no | no | no | yes | no | no | no | no | no |
| Double Flash Bore (mm) | n.a. | n.a. | n.a. | 2.3698 | n.a. | n.a. | n.a. | n.a. | n.a. |
| Discharge Device | | | | | | | | | |
| Discharge Device 60 | plodder | plodder | plodder | plodder | pump | pump | pump | see** | plodder |
| Extrusion Bore Size (mm) | 1 | 1 | 1 | 3 | n.a. | n.a. | n.a. | n.a. | 1 |
| No. of Extrusion Holes | 160 | 160 | 160 | 24 | n.a. | n.a. | n.a. | n.a. | 160 |
| Starting Composition | | | | | | | | | |
| Solids (wt. %) | 76.1 | 76.21 | 76.07 | 73.6 | 58 | 58 | 48.6 | 45 | 69.3 |
| Water (wt. %) | 23.9 | 23.79 | 23.93 | 26.4 | 42 | 42 | 51.4 | 55 | 30.7 |
| Color, 5% Klett | 3.4 | 4 | 4 | 59 | | | | | |
| pH, 10% Solids | 8.9 | 10 | 9.8 | 11.6 | | | | | |
| Active (wt. %) | 74.3 | 74.1 | 74.7 | 71.64 | | | | | |
| xs NaOH (wt. %) | 0.04 | 0.06 | 0.22 | 0.26 | | | | | |

TABLE 2-continued

| Example No. | 1a | 1b | 2 | 3 | 4a | 4b | 5 | 6 | 7 |
|---|---|---|---|---|---|---|---|---|---|
| Free Oil (wt. %) | 0.83 | 0.86 | 0.75 | 1.23 | | | | | |
| Na$_2$SO$_4$ (wt. %) | 0.38 | 0.57 | 0.4 | 0.5 | | | | | |
| Sodium Citrate (wt. %) | 0.52 | 0.52 | 0 | | | | | | |
| Product Composition | | | | | | | | | |
| Solids (wt. %) | 97.6 | 98.43 | | 96.6 | 97 | 96.5 | 96.8 | 89.4 | 97.25 |
| Water (wt. %) | 2.37 | 1.57 | | 3.4 | 3 | 3.5 | 3.2 | 10.6 | 2.75 |
| Color, 5% Klett | 4.1 | 4.9 | | 57 | | | | | |
| pH, 10% Solids | 9.6 | 7.1 | | 11.3 | | | | | |
| Active (wt. %) | 95.6 | 96.1 | | 94.11 | | | | | |
| xs NaOH (wt. %) | 0.14 | 0 | | 0.32 | | | | | |
| Free Oil (wt. %) | 0.726 | 0.882 | | 1.5 | | | | | |
| Na$_2$SO$_4$ (wt. %) | 0.497 | 0.748 | | 0.67 | | | | | |
| Sodium Citrate (wt. %) | 0.67 | 0.673 | | | | | | | |

\*= One tube clogged with the composition.
\*\*= A special discharge device as detailed in Example 6 was used.

Example 8

This example illustrates the drying of a material which flashes out of the flow restriction as a dry powder with non-caking properties, requiring only a minor amount of further drying during conveyance through the dryer tubes.

A. Composition

A 24 wt. % solution of ammonium chloride (the balance, 76 wt. % was water) was used for this example.

B. Apparatus

The apparatus used in this example includes a pre-heater disposed upstream of a single-channel jacketed dryer, the dryer having an inlet chamber and a flow restriction disposed immediately upstream of the channel. The dryer channel was a stainless steel tube having an internal diameter of about 11.28 mm (0.44 inches) and was 5.54 meters (18 feet 2 inches) in length. The single-tube discharged into a cyclone separator.

C. Drying Operation and Results

About 15.8 kilograms per hour (about 35 pounds per hour) of the 24% ammonium chloride solution was heated to 151° C. and flashed into the dryer tube. The pressure at the top of the dryer tube was maintained at 0.32 bar absolute (4.6 pounds per square inch absolute (psia)) and the pressure at the discharge of the dryer tube was 0.08 bar absolute (1.2 psia). The jacket of the tube was supplied with trapped 100 psig (7 bar gauge) steam.

A dried product (i.e., concentrate) having a moisture content of 0.5 wt. % was separated from the water vapor in the cyclone separator and discharged from the separator as a fine powder in a collection bag.

The foregoing description is given for clearness of understanding only, and no unnecessary limitations should be understood therefrom, as modifications within the scope of the invention will be apparent to those skilled in the art.

We claim:

1. A process for removing a volatile component from a composition, the process comprising the steps of:
   (a) providing a dryer having an inlet chamber, a plurality of channels, and a plurality of flow restrictions, each of the channels having an inlet operating at a pressure, each flow restriction disposed between the dryer inlet chamber and one cooperating channel, the flow restriction being immediately upstream of the cooperating channel inlet with respect to a direction of flow of the composition through the dryer;
   (b) heating the composition at a location upstream of the flow restrictions to a temperature above a flashing temperature of the volatile component at the pressure of each channel inlet;
   (c) applying pressure to the composition to avoid flashing of the volatile component upstream of the flow restrictions;
   (d) passing the pressurized, heated composition through the dryer inlet chamber and through the flow restrictions, the volatile component flashing into each channel inlet, resulting in two-phase flow of the composition at each channel inlet; and
   (e) passing the composition in two-phase flow through and out of each channel.

2. The process of claim 1 further comprising supplying heat to the composition as the composition passes through each channel.

3. The process of claim 1 wherein each channel is disposed downstream of a plurality of flow restrictions arranged in series with respect to the direction of flow of the composition through the dryer.

4. The process of claim 1 wherein the flow restrictions are defined by a plate having a plurality of apertures extending therethrough, each aperture disposed upstream of one channel inlet and having a cross-sectional area smaller than a cross-sectional area of the cooperating channel inlet.

5. The process of claim 4 wherein the apertures are bore holes.

6. The process of claim 1 further comprising the step of injecting a vapor into the plurality of channels.

7. The process of claim 6, wherein said vapor is steam.

8. The process of claim 1, wherein the volatile component comprises a solvent selected from the group consisting of water and alcohol.

9. The process of claim 1 further providing at least one secondary flow restriction disposed downstream of each channel inlet and including the step of passing the composition through the at least one second flow restriction.

10. The process of claim 9 wherein the at least one secondary flow restriction is defined by a plate having an aperture extending therethrough, the aperture having a cross-sectional area smaller than a cross-sectional area of the cooperating channel.

11. The process of claim 10 wherein the aperture of the secondary flow restriction is a bore hole.

12. The process of claim 1, further comprising the step of collecting the composition in a collection vessel disposed downstream of an outlet of each channel.

13. The process of claim 12 wherein the collection vessel operates at a pressure less than an operating pressure of the outlet of each channel.

14. The process of claim 12 wherein the collection vessel operates at a pressure of about 1 bar absolute or less.

15. The process of claim 12, further comprising the step of venting the volatile component from a remainder of the composition in the collection vessel.

16. An apparatus for removing a volatile component from a composition, the apparatus comprising:

(a) a device for heating the composition;

(b) means for applying pressure to the composition;

(c) a dryer disposed downstream of the heating device and the pressure applying means, the dryer comprising:
   (1) an inlet chamber;
   (2) a plurality of flow restrictions disposed downstream of the inlet chamber with respect to a direction of flow of composition through the dryer; and
   (3) a plurality of channels, each channel having an inlet and an outlet, the inlet of each channel being disposed immediately downstream of one cooperating flow restriction with respect to the direction of flow of the composition through the dryer for receiving the pressurized, heated composition flowing through the dryer inlet chamber and through the flow restrictions such that the volatile component flashes into each channel inlet, resulting in two-phase flow of the composition at each channel inlet and two-phase flow of the composition through and out of each channel; and, (d) means for collecting composition flowing from the outlet of each channel having a vapor outlet and an outlet for a remainder of the composition.

17. The apparatus of claim 16 wherein each channel is defined by a tube.

18. The apparatus of claim 16 wherein each channel is disposed downstream of a plurality of flow restrictions arranged in series.

19. The apparatus of claim 16 wherein the flow restrictions are defined by a plate having a plurality of apertures extending therethrough, each aperture disposed upstream of one channel inlet and having a cross-sectional area smaller than a cross-sectional area of the cooperating channel inlet.

20. The apparatus of claim 19 wherein the apertures are bore holes.

21. The apparatus of claim 16 further comprising means for injecting vapor into the channels.

22. The apparatus of claim 16 further comprising at least one secondary flow restriction disposed downstream of each channel inlet.

23. The apparatus of claim 22 wherein the secondary flow restrictions are disposed adjacent to the channel outlets.

24. The apparatus of claim 22 wherein the at least one secondary flow restriction is defined by a plate having an aperture extending therethrough, the aperture having a cross-sectional area smaller than a cross-sectional area of the cooperating channel.

25. The apparatus of claim 24 wherein the aperture is a bore hole.

26. The apparatus of claim 16 further comprising an extruder disposed downstream of the channel outlets.

27. The process of claim 1 comprising:

(f) cooling the composition downstream of an outlet of each channel.

28. The process of claim 27 wherein said cooling step comprises:

extruding the composition to form strings and passing pre-cooled air through said strings.

29. The process of claim 27 wherein said cooling step comprises:

pneumatically conveying the composition through a conduit with a stream of pre-cooled air.

30. The process of claim 27 wherein said cooling step comprises:

spreading the composition onto a top surface of a metal belt and spraying a chilled coolant onto an underside of the belt.

* * * * *